Feb. 26, 1957  F. A. KROHM  2,782,442
WINDSHIELD WIPER BLADE ASSEMBLY AND METHOD
OF ASSEMBLING THE COMPONENTS THEREOF
Filed Jan. 30, 1953  2 Sheets-Sheet 1
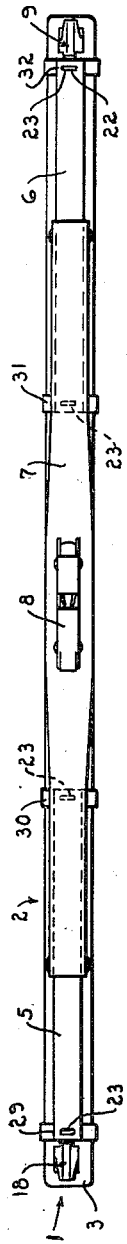
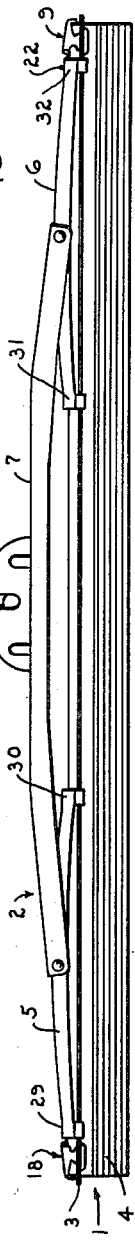
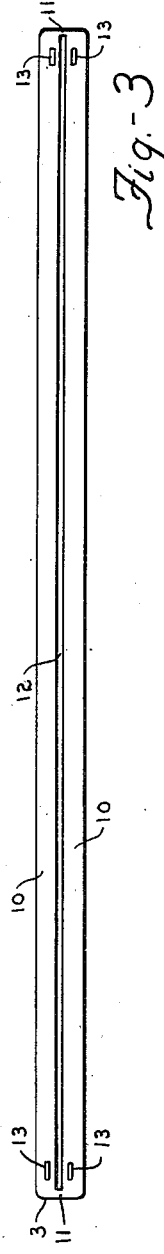
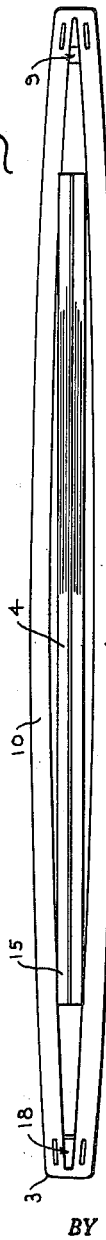
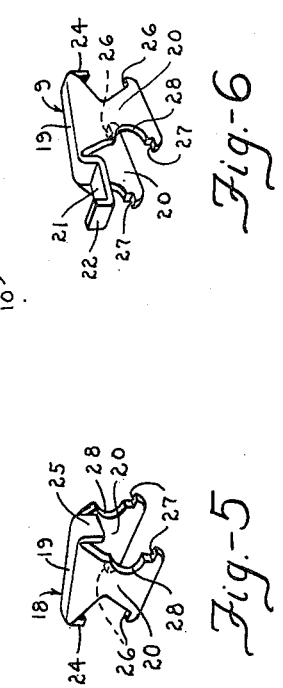
INVENTOR.
FRED A. KROHM
BY
Charles S. Penfold
ATTORNEY

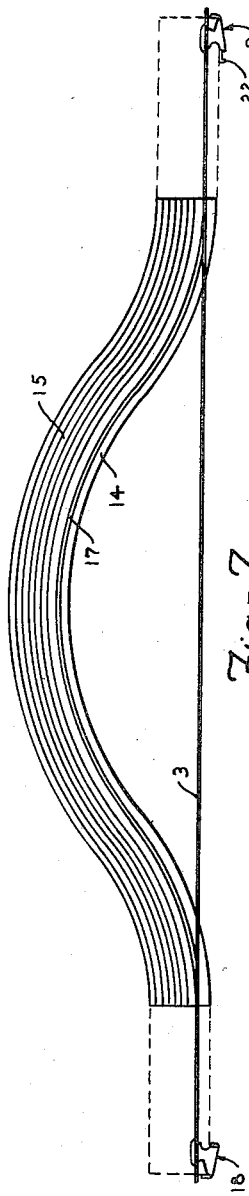
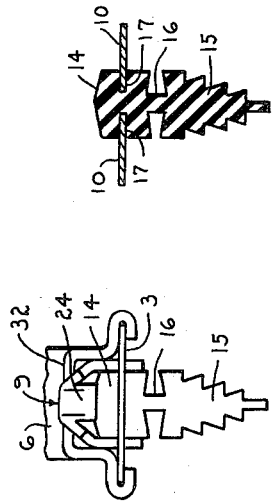
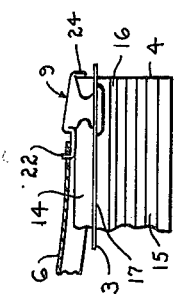
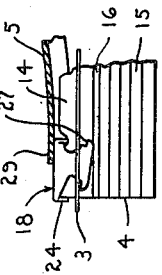
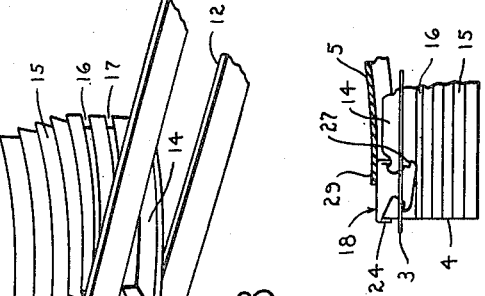
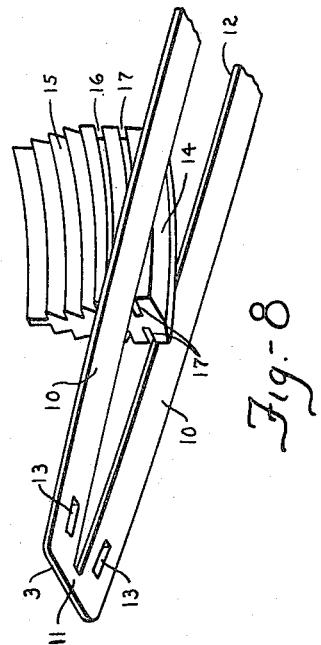
INVENTOR.
FRED A. KROHM

United States Patent Office 2,782,442
Patented Feb. 26, 1957

2,782,442

WINDSHIELD WIPER BLADE ASSEMBLY AND METHOD OF ASSEMBLING THE COMPONENTS THEREOF

Fred A. Krohm, Hobart, Ind., assignor to Productive Inventions, Inc., a corporation of Indiana Application January 30, 1953, Serial No. 334,147

8 Claims. (Cl. 15—245)

This invention relates generally to windshield wipers preferably adapted for cleaning curved windshields.

More particularly the invention is directed to a wiper assembly comprising a wiper blade and a pressure device therefor. The wiper blade comprises an elongated resiliently flexible support or backing and a resilient wiper element and the pressure device preferably includes a pair of secondary yokes having their ends operatively connected to the blade, a primary yoke having its ends respectively connected to the secondary yokes, and means on the primary yoke for attachment with a windshield wiper arm.

This application is generally related to my copending applications Serial Nos. 297,098 and 341,051, and pending applications of John W. Anderson, Serial Nos. 404,279, 612,542, and 573,012, all of which disclose various forms of locking means or abutment means for detachably holding a wiper blade unit and a pressure unit together and/or whereby the components of the blade unit are detachably connected.

It is recognized that various means and methods have been employed to connect the flexible support and resilient wiping element of such a wiper blade together. In some blades now in commercial use the support is comprised of several individual or separate parts which are secured together by fasteners and in other blades the support and element are so constructed that they are not only difficult to assemble but when once assembled the wiping element is not sufficiently free in its movement to permit it to readily conform to a surface to be cleaned.

With the foregoing in mind, an important object of the invention is to provide a wiper blade embodying novel principles of design and construction and a unique method of assembling the flexible support and resilient wiping element constituting the components of the blade.

More particularly, the invention overcomes certain disadvantages inherent in the commercial forms of blades above referred to and has proven to be of great value in facilitating assembly of the components and reducing costs of manufacture.

Another object of the invention is to provide improved means for operatively connecting the wiper blade and pressure device therefor. The means for this purpose preferably includes a fitting or lock which is carried by the blade and interlocks with either of the secondary yokes to hold the blade and device detachably connected so that if desired the pressure device may be provided with a new blade.

An additional object of the invention is to provide a fitting which can be easily and quickly connected to the blade in a manner whereby the resilient wiping element serves to normally maintain the fitting in a locking position.

Other objects and advantages of the invention will become apparent after the description hereinafter set forth is considered in conjunction with the drawings annexed hereto.

In the drawings:

Figure 1 is a top view of the wiper blade assembly embodying the invention;

Figure 2 is a side view in elevation of the assembly depicted in Figure 1;

Figure 3 is a top view of the support of the wiper blade;

Figure 4 is a bottom view of the support and wiping element showing portions of the support spread apart to receive the wiping element;

Figures 5 and 6 are perspective views of fittings which are adapted for attachment to the support;

Figures 7 and 8 are views showing the manner in which the wiping element and support are assembled;

Figure 9 is an end view of the wiper blade;

Figure 10 is a transverse section showing the connection between the support and wiping element; and Figures 11 and 12 exemplify the mode of assembling the wiper blade and pressure device therefor.

Referring more particularly to the drawings, the windshield wiper blade is generally designated 1 and the pressure device therefor is designated 2.

The wiper blade is comprised of an elongated resiliently flexible support or backing 3 and a resilient wiping element 4 carried by the support.

The pressure device may be constructed in various ways but as herein illustrated preferably includes a pair of corresponding secondary yokes 5 and 6 having their ends connected to the wiper blade, a primary yoke 7 having its ends connected to intermediate portions of the secondary yokes, a connector 8 carried by the primary yoke for connection with a windshield wiper arm, and a fitting or locking means 9 for operatively connecting the wiper blade and pressure device.

The flexible support 3 is preferably constructed from suitable flat spring strip material, such as stainless steel. The support is preferably of a predetermined uniform thickness and width so that the blade may uniformly freely flex and conform to the surface to be cleaned. Due to the character of the support, the blade is primarily limited to flexation or movement in a direction substantially perpendicular to a surface of a windshield to be cleaned.

The support, as shown in Figure 3, is preferably constructed in one piece and includes a pair of corresponding longitudinally extending parallel flat portions or members 10 and a pair of corresponding integral connecting portions 11 adjacent the extremities of the support for joining the longitudinal portions together. Expressed otherwise, the support is provided with a centrally disposed longitudinal slot 12. A pair of smaller slots 13 is provided adjacent each end of the support in straddling relationship to the center slot 12. As will be described more in detail subsequently the longitudinally extending portions 10 of the support are adapted for relative movement so as to accommodate the wiping element and either pair of slots 13 is adapted to receive portions of the locking means 9.

The wiping element, as clearly exemplified in Figures 9 and 10, is provided with an attaching portion 14 and a wiping portion 15 which is joined to the attaching portion by an intermediate restricted portion or web 16 so as to permit tilting of the wiping portion. The attaching portion is provided with a pair of corresponding grooves 17, one being located adjacent each side of the attaching portion in a predetermined position so that they lie substantially in the same plane. The grooves 17 receive the inner marginal edge portions of the longitudinally extending portions 10 of the support for holding the support and element assembled.

The fitting or locking means 9, clearly shown in Figures 2, 6 and 9, is attached to one end of the support and a fitting 18 of similar construction is attached to its other end. Each fitting is preferably of channel construction and includes an upper inclined wall 19 and corresponding legs 20 adapted for disposition in a pair of slots 13. The fitting 9 is different from the fitting 18 in that the inner end of its upper wall is provided with a continuation forming an offset 21 terminating in an upturned finger 22 for entry into a transverse opening 23 provided in the end of the secondary yoke 6 as shown in Figures 1 and 2. With this arrangement a portion of the secondary yoke 6 is located in a recess defined by the continuation to provide a positive interlock between the secondary yoke and fitting. The outer end of the wall of each fitting is also provided with a downturned stop 24 which may engage an end of the wiping element. Although the fitting 18 is not provided with a continuation having a finger thereon, it is provided with a portion 25. This portion 25 and the continuation 21 on the fitting 9 are adapted to bear against the top of the attaching portion 14 of the wiping element for support thereby. Each of the legs 20 of the fittings is widened at its free extremity to provide a pair of abutments 26 and a pair of abutments 27 for engaging the underside of the support. It will be noted that each of the legs is provided with a notch 28 to provide clearance to permit entry of the legs in an angular direction into the slots 13.

Assembly of the fittings 9 and 18 with the wiper blade and the support with the wiping element will now be described. One method consists in fastening the fittings in the support and then placing the support in a suitable jig or fixture so that the fittings assume depending positions as depicted in Figure 7. Assembly of the support and wiping element is unique. It is easily and preferably accomplished by gripping the longitudinally extending portions 10 and then spreading, bowing, or flexing the portions outwardly substantially in the same plane as illustrated in Figures 4 and 8 to enlarge the slot 12 so that it is wider adjacent the mid-area of the support and tapers in opposite directions from such area. The ends of the wiping element are then directed into the slot as illustrated in Figures 7 and 8 to place the grooves 17 in registry with the inner edges of longitudinal portions 10 of the support, whereupon the ends of the element are pulled or pushed simultaneously outwardly toward the ends of the support into receiving relationship with the fittings, after which the longitudinal portions 10 of the support are released from tension so they automatically return to their normal parallel positions and in embracing connecting relationship with the element. The base of the fixture for holding the support is preferably provided with a longitudinally extending groove which is of a predetermined width and depth to assist in piloting and guiding the wiping element into the slot 12 of the support.

If found desirable, first one and then the other extremity of the wiping element may be inserted into the respective ends of slot 12. Also, one or both of the fittings 9 and 18 can be attached to the blade after the support and wiping element are assembled. For example, the ends of the wiping element can be pulled or pushed toward the center of the support to permit entry of the fittings into the pairs of slots 13, after which the ends of the element are forced outwardly into the fittings. More specifically in this respect, either or both of the fittings can be attached to the support before or after the element and support are assembled. It should be noted that the arrangement is such that either end of the element can be inserted into either half of the slot 12 from either side of the support and that either fitting can be inserted into either pair of the slots 13.

Referring again to the pressure device 2, attention is directed to the fact that the ends of the secondary yoke 5 are provided with formations 29 and 30 and the ends of the secondary yoke 6 with formations 31 and 32. These formations embrace the exposed outer longitudinal marginal edge portions of the support as clearly shown in Figures 1, 2 and 9 and each formation is preferably provided with an opening 23. When the blade and pressure device are assembled, the formations 29, 30 and 31 are constructed to freely slide on the support whereas the formation 32 is interlocked with the fitting 9 against movement. With this setup either secondary yoke can be connected to either end of the primary yoke so that an opening 23 in the outer extremity of each secondary yoke will be located adjacent a fitting.

Assembly of the wiper blade and pressure device can be easily effected by inserting either end of the wiper blade into either end of the pressure device. More particularly in this respect, the preferred method, as illustrated to some extent in Figure 11, is to place the left end of the support into the formation 32 and then force the formation over the upper wall 19 of fitting 18, which wall due to its inclination will cam the fitting downwardly and compress the attaching portion 14 of the wiping element. After this formation passes this fitting the fitting will return to its original predetermined position. The formation 31 of the secondary yoke 6 and the formation 30 of yoke 5 are then successively pressed over the fitting 18 and when the formation 32 is brought into abutting relation with the finger 22 of fitting 9, the fitting 9 is manipulated by a digit of the hand or other means against the wiping element so that the formation 32 can be pressed on the fitting 9 to cause the finger 22 to automatically enter or snap into the opening 23 in formation 32. When assembled in this manner, the pressure device and wiper blade will appear as illustrated in Figures 1 and 2 with the secondary yoke 6 interlocked with the fitting 9. With this novel arrangement the wiping element serves to lock the fitting 9 to the support and element and interlock the pressure device to the blade.

The assembly of the blade and pressure device just described requires that the fitting 18 be depressed four times by the formations on the secondary yokes. A different method of assembly can be effected by sliding the pressure device and the blade into connection from directions opposite to those above described, in which event, the formations 29, 30, 31 and 32 on the secondary yokes will successively depress the fitting 9, but direct manual pressure must be applied to the formation 30 to release it from the finger 22 before formations 31 and 32 can cam the fitting against the wiping element.

The fitting 18 normally serves to improve the appearance of the blade assembly by covering the left end of the wiping element in the same manner as the fitting 9 but does not interlock the pressure device with the blade. The fitting 18 may also serve as a stop to prevent detachment of the pressure device and blade if for any reason the fitting 9 should become accidently disconnected from the secondary yoke 6.

Having thus described my invention, it is obvious that various modifications may be made in the same without departing from the spirit of the invention; and, therefore, I do not wish to be understood as limiting myself to the exact form, construction, arrangement, and combination of parts herein shown and described and defined in the claims.

I claim:

1. A windshield wiper blade comprising an elongated resilient wiping member and an elongated resiliently flexible member having longitudinal portions embracing supporting the wiping member, a pressure device mounted on the blade, a pair of openings provided adjacent each extremity of the flexible member, a pair of fittings, each of said fittings having portions held in said openings by said wiping member, and means providing a detachable connection between one of the fittings and the pressure device.

2. A windshield wiper blade assembly and a pressure device for the assembly, said assembly comprising a resiliently flexible support having a pair of longitudinally extending portions, said assembly also including a resilient wiping element supported by and between said portions, said pressure device comprising a pair of members slidably and detachably connected to the extending portions and a bridge connecting the members, said bridge being provided with means for attaching the bridge to a wiper arm, and means at one end of the blade detachably connecting the support and the outer end of one of the members for holding the blade assembly and pressure device operatively assembled, said means straddling and bearing against the element so that the element serves to maintain said means in a predetermined position.

3. A connector for use with a wiper blade having a resilient wiping element and a support for the element provided with a pair of openings, said connector having a top wall for engaging the element and provided with an offset for connection with a pressure device adapted for association with the blade, said connector having a pair of side walls provided with narrow portions adapted for disposition in the openings of the support and also provided with enlarged portions adapted to engage the underside of the support.

4. A windshield wiper blade having a resilient wiping element and a flexible support therefor, said element having an upper portion disposed above the support and said support being provided with a pair of openings located on opposite sides of the upper portion of the element and spaced inwardly from the exterior marginal edges of the support, a connector having a top wall engaging said upper portion and an end wall engaging an end of the element, and said connector also having a pair of side walls straddling the said upper portion and held in said openings, said connector serving as a stop to limit movement in one direction of a pressure device adapted for association with the blade.

5. A method of assembling the components of a windshield wiper blade including a wiping element having exterior grooves and a support having a pair of longitudinally extending resiliently flexible members adapted for interlocking engagement with the grooves and having a thickness less than their width so that they are flexible in a direction perpendicular to their width and substantially inflexible in the direction of their width, which comprises forcibly spreading and holding the members in the direction of their width, bending the element and inserting its ends between the members and moving said ends toward the extremities of the support so that portions of the members are received in the grooves and other portions of the members are disposed opposite the grooves, and then releasing the members so that the other portions thereof move into the grooves to interlock the element and support.

6. A method of assembling the components of a windshield wiper blade including a wiping element having exterior seats and a support having a pair of spaced longitudinally extending resiliently flexible substantially parallel members adapted to engage said seats and having a thickness less than their width so that they are flexible in a direction perpendicular to their width and substantially inflexible in the direction of their width, which comprises forcibly moving at least one of the members out of said parallel relation in the direction of its width to increase the space between the members, inserting the element in the increased space between the members so that portions of the members engage the seats and another portion of at least one of the members is spaced from its seat, and then re-establishing the parallel relation of the members to reduce the increased space so the members will engage said seats to hold the components assembled.

7. A method of assembling the components of a windshield wiper blade including a wiping element having exterior seats and a support having a pair of longitudinally extending resilient flexible members for engaging the seats and having a thickness less than their width so that they are readily flexible in a direction perpendicular to their width and substantially inflexible in the direction of their width, which comprises forcibly spreading the members in the direction of their width, bending the element and inserting its ends between the members and moving them toward the ends of the support so that portions of the members engage the seats and other portions of the members are disposed for engaging the seats, and then re-establishing the original relationship of the members so that the said other portions of the members engage the seats to hold the components assembled.

8. A method of assembling the components of a windshield wiper blade including a wiping element having exterior seats and a support having a pair of longitudinally extending resiliently flexible members secured together in a normal predetermined side-by-side relationship and having a thickness less than their width so that they are readily flexible in a direction perpendicular to their width and substantially inflexible in the direction of their width, which comprises forcibly moving at least one of the members in the direction of its width relative to the other member to provide an opening of a size to accommodate the wiping element, inserting the element into the opening so that portions of the members engage the seats and another portion of at least one of the members is disposed opposite its seat, and then re-establishing the normal side-by-side relationship of the members so they engage the seats and hold the components assembled.

References Cited in the file of this patent

UNITED STATES PATENTS

| 1,789,636 | Oberti | Jan. 29, 1931 |
| 2,596,063 | Anderson | May 6, 1952 |
| 2,658,223 | Enochian | Nov. 10, 1953 |

FOREIGN PATENTS

| 683,375 | Great Britain | Nov. 26, 1952 |